United States Patent

[11] 3,629,578

[72] Inventor Jan B. Le Poole
   Tucson, Ariz.
[21] Appl. No. 794,039
[22] Filed Jan. 27, 1969
[45] Patented Dec. 21, 1971
[73] Assignee U.S. Philips Corporation
   New York, N.Y.

[54] MAGNETIC DEFLECTION SYSTEM FOR ELECTRON ANALYSIS DEVICES
   10 Claims, 11 Drawing Figs.

[52] U.S. Cl. .................................................. 250/49.5 D,
   250/49.5 PE, 250/49.5 A
[51] Int. Cl. ........................................... H01j 37/26,
   G01n 23/22
[50] Field of Search.......................................... 250/49.5
   (1), 49.5 (3), 49.5 (4), 49.5 (8); 335/210

[56] References Cited
   UNITED STATES PATENTS

| | | | |
|---|---|---|---|
| 3,225,192 | 12/1965 | Katagiri et al. | 250/49.5 |
| 3,229,087 | 1/1966 | Shapiro | 250/49.5 |
| 3,243,667 | 3/1966 | Enge | 250/49.5 |
| 3,287,558 | 11/1966 | Bly et al. | 250/49.5 |
| 3,398,385 | 8/1968 | Grunwald | 335/210 |

FOREIGN PATENTS 979,098  12/1950  France ........................ 250/49.5

*Primary Examiner*—William F. Lindquist
*Attorney*—Frank R. Trifari

ABSTRACT: A magnetic deflecting system for deflecting a beam of charged particles comprising a pair of mirror symmetrical pole-pieces on opposite sides of a plane of symmetry passing through a principal ray of the beam. The surfaces of the pole-pieces have contours which define a space between the pole-pieces which varies stepwise in the direction of the main ray with a centrally constricted portion which defines a region of highest field strength. The deflection system has a field strength at which the main ray entering the deflection system, which ray extends at least partly in the direction of the constricted space between the pole-pieces, follows a curve which passes in front of the pole-pieces in the region of the highest magnetic field strength. Means are provided to produce a field strength distribution at the area of the minimum distance of the curve from the region of the highest field strength which, measured in the direction towards the highest field strength, exhibits at that area a locally stronger field strength gradient. This field strength distribution affects the beam so that a curvature of image lines transverse to the plane of symmetry in a plane transverse to the main ray is counteracted, i.e., electron-optical aberrations are reduced.

INVENTOR.
JAN BART LE POOLE
BY
AGENT

MAGNETIC DEFLECTION SYSTEM FOR ELECTRON ANALYSIS DEVICES

The invention relates to a device having a beam of charge carriers and comprising a magnetic system for deflecting said beam, said system having two magnetic poles arranged in mirrorlike fashion with respect to a plane of symmetry going through the main ray of the beam, the opposite pole faces of which poles enclose a narrowing field space.

In a known device of this kind, which may be constructed as an electron microscope, the poles are formed by sectors of a body of revolution having pole faces whose lines of intersection with a plane going through the axis form a parabola having its peak on the axis or a tangent to such a parabola. In this device an electron beam enters the field space laterally, that is to say, tangentially and transversely of a boundary face of the poles located in a plane going through the axis of revolution. The deflection system operates as a positive lens focusing in two directions provided the main ray follows an arc of a circle around the axis within the poles and the magnetic field strength in the vicinity of this arc is inversely proportional to the root of the distance from the axis.

In the device according to the invention the deflection system rather has the function of a negative lens and serves in the first place as a magnetic mirror which deflects the electron beam over a greater or smaller angle, which may readily be made about 180°.

According to the invention the device set forth is characterized in that the strength of the deflection system, the energy and the nature of the particles of the beam are relatively adjusted so that the main ray of the beam entering the deflection system extending at least partly in the direction of constriction of the field space follows within this field space a curve which passes by in front of the region of the highest magnetic field strength and in that means are provided for producing a field strength distribution at the area of the minimum distance of said curve from the region of highest magnetic field strength, which distribution, measured in the direction towards the region of highest magnetic field strength, exhibits at said area a locally stronger field strength gradient and which field strength distribution affects the beam to an extent such that curving of image lines transverse to the plane of symmetry in a plane transverse to the main ray is counteracted.

In a preferred embodiment said locally stronger field strength gradient is obtained by providing a steplike profile of the pole faces at a distance from the region of the highest field strength corresponding with the minimum distance between said region and the main ray of the beam, so that the space between the two pole faces in the direction towards the region of the highest field strength exhibits a more or less abrupt constriction. In a further preferred embodiment the locally stronger field strength gradient is obtained by forming the magnetizable poles from different parts which have to be energized differently and which are located one after the other in the direction towards the region of the highest magnetic field strength in the field space and which are separated from each other by a narrow ferromagnetism-free gap at the area of the pole face formed by the common ends of said parts, one of said separating gaps being located at a distance from the region of the highest field strength corresponding with the minimum distance between said region and said main ray. If in the plane of symmetry the lines formed by the points of the same field strength are curved in convex fashion, viewed from the incoming beam, the deflection system has a diverging effect on the beam. Such a diverging effect is preferably obtained by means of poles whose opposite pole faces are located in planes of revolution about an axis transverse of the plane of symmetry. It is advantageous to have the region of locally stronger field strength gradient positioned approximately midway between the outer periphery of the pole faces and the axis of revolution. In this way a deflection system is obtained the action of which is similar to that of a spherical mirror, the magnification being approximately the same in the plane of symmetry and in a plane at right angles thereto.

The device according to the invention is preferably constructed as an electron microscope, in which said deflection system is positioned after the object lens and deflects the electron beam through an angle larger than 90° and the electron beam emanating from the deflection system is directed to a target member for the display or recording of the image, said target member being preferably arranged approximately at the height of the object lens.

In a further device embodying the invention it constitutes an X-ray analyzer comprising a microelectron beam probe directed to the object to be examined, in which by means of the deflection system arranged near the focus of a hollow electron mirror a collimated electron beam is deflected and directed to the electron mirror which mirror focuses the beam to the object arranged in the vicinity of the deflection system.

The invention will be described with reference to the drawing, which shows a few embodiments.

In the drawing

FIG. 1 is a sectional view of the construction of a magnetic deflection device for use in an apparatus according to the invention, FIG. 2 shows half of a sectional view of a pole face in the deflection system of FIG. 1 with different scales in the horizontal and vertical directions, FIG. 3 is a plan view of the plane of symmetry of the deflection system of FIGS. 1 and 2 with the track of an electron beam deflected by the magnetic field, FIG. 4 shows various sections of this electron beam at the areas A–A', B–B' and C–C' in FIG. 3.

Figure 1:
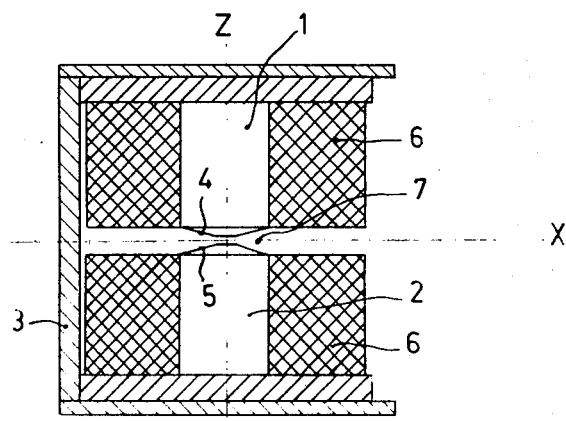

The magnetic deflection system shown in a cross-sectional view in FIG. 1, comprises two magnet poles 1 and 2 forming each substantially a cylinder of revolution having the same axis Z. The distal ends are interconnected by a magnetic yoke 3, which is open at least on the right-hand side of FIG. 1. The proximal ends of the poles 1 and 2 form pole faces 4 and 5, forming planes of revolution and being relative reflections with respect to the plane of symmetry (x–yplane) transverse of the plane of the drawing and going through the line X of FIG. 1. Each of the magnet poles 1 and 2 is provided with an energizing winding 6.

Figure 2:
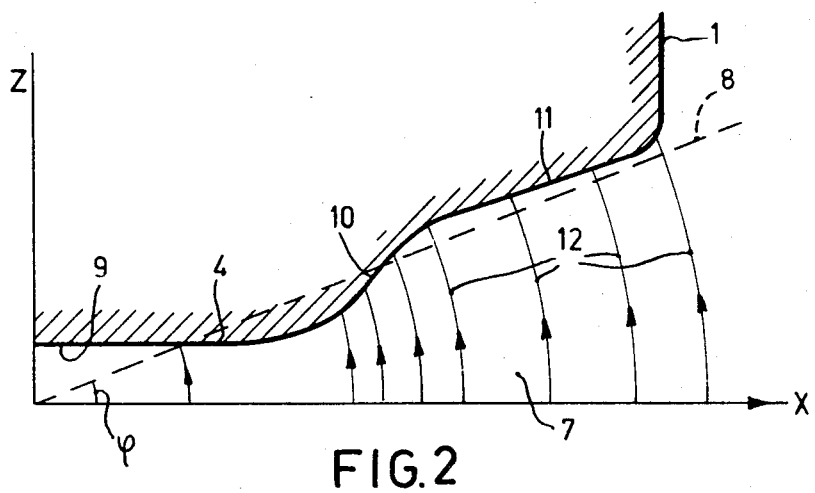

The central portion of the pole faces 4 and 5 extends parallel to said X–Y plane and the adjacent portions have more or less the plane of a cone of revolution, the Z-axis being the axis of revolution, the vertex lying in the X–Y plane. FIG. 1 shows schematically the shape of the pole faces. FIG. 2 shows in detail the intersection of the pole face 4 with the right-hand part of the Z–X plane. It should be noted that in FIG. 2, for the sake of clarity, the unit of length in the Z-direction is chosen four times that of the X-direction As will be apparent from FIG. 2, the intersection of the pole face 4 with the Z–X plane shown forms approximately a straight line 8 (FIG. 2), which passes through the point of intersection of the Z- and X-axes, it being at an angle Φ to the X-axis, which is, in fact, about 6°. The pole face 4 itself therefore follows to a given extent the conical plane obtained by the revolution of the line 8 about the Z-axis The pole face 4 and also the opposite pole face 5 (not shown in FIG. 2) have, in outward radial direction, a portion 9, which is parallel to the X–Y plane and an adjacent portion 10, which is definitely at a larger angle to the X–Y plane than the cone obtained by the revolution of the line 8, and subsequently a portion 11, which is to the X–Y plane at an angle which is slightly smaller than the angle between said cone and the X-Y plane. This results in that viewed in any radial direction towards the Z-axis the field space 7 between the pole faces 4 and 5 exhibits after an initial uniform constriction owing to the steplike salience of the portions 10 of the pole faces towards the X-Y plane a considerably more drastic constriction over a comparatively small radial part, after which the dimensions of the field space in the Z-direction remains substantially constant. In the portion of the field space enclosed between the portions 11 of the pole faces 4 and 5 the magnetic field strength in the X-Y plane is approximately inversely proportional to the distance from the Z-axis. In the portion of the field space bounded by the portions 10 of the pole faces the field strength gradient, that is to say, the absolute value of the variation of the field strength per unit of length in the direction towards the Z-axis is considerably higher. In the portion of the field space bounded by the portions 9 the magnetic field strength in the X-Y plane is substantially constant.

FIG. 2 shows in the field space 7 the intersections 12 of the X-Z plane with a number of planes of constant magnetic field strength, the difference between the values of the field strengths in the successive planes being approximately constant.

Examples of possible practical values of various dimensions of the deflection system of FIG. 1 are as follows: diameter of the poles 1 and 2: 22.2 mm., minimum distance between the central portions of the pole faces 4 and 5: 0.5 mm., the constriction of the field space between the portions 10 of the pole faces is about 0.8 mm. over a radial path of 2 mm. The deflection system described is employed in a device according to the invention for deflecting a comparatively thin beam of charge carriers for example electrons, having for example a diameter of 0.75 to 1 mm. This beam penetrates into the field space 1 in the X-Y plane and the energization of the deflection system described, the energy and the charge of the particles of the beam are relatively adapted so that the beam deflected by the magnetic field passes in front of the Z-axis. The main ray of the beam, which ray is formed by the loci of the consecutive centers of the beam located in the X-Y plane, reverts, viewed from the Z-axis, in the portion of the field space between the portions 10 of the two pole faces.

Figure 3:
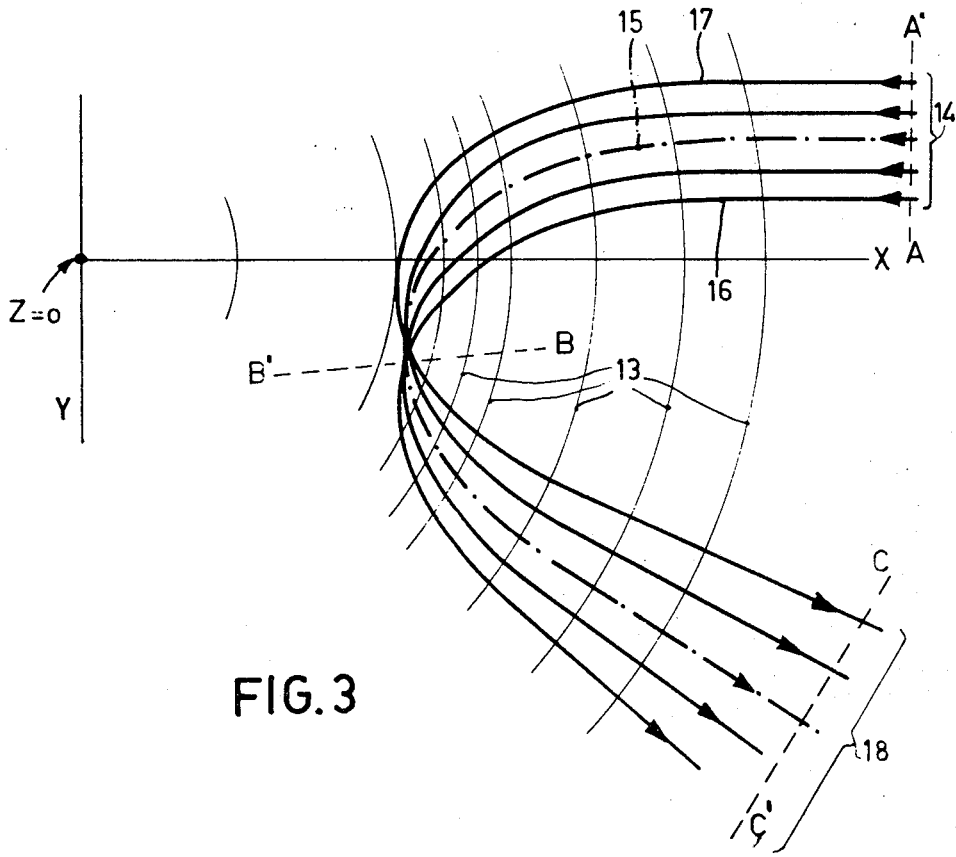

FIG. 3 is a plan view of the X-Y plane of the deflection system shown in FIGS. 1 and 2, the scale for the X-axis and the Y-axis being that of the X-axis of FIG. 2. In this plane 13 designates the intersections of the planes of constant magnetic field strength whose intersections with the X-Z plane of FIG. 2 are designated by 12. In this plane are furthermore indicated various paths of the electrons of a beam 14 entering the field space 7 in parallel with the X-axis. The main ray of the beam deflected to the left within the field space 7 by the magnetic field going from the pole face 5 to the pole face 4 is indicated by 15. Electrons having their paths such as 16 in the incoming beam 14 nearer the X-axis than the main ray 15 are deflected to a lesser extent, whereas electrons having their paths, for example, 17 further remote from the X-axis are deflected more strongly than the electrons traveling in the main ray 15. The depth of penetration of the various electrons in the field space 7 differs only slightly on the various paths. Viewed from the Z-axis the electrons revert at the area of the strong constriction of the field space 7 between the portions 10 of the pole faces, that is to say, the area where the field strength gradient has a value increased to a greater or lesser extent. This penetration depth may be obtained by a field produced by the energization of the two coils 6 of the deflection system with about 150 ampere turns and a beam of electrons accelerated to about 10 kv. It has been found that the energization required is proportional to the root of the acceleration voltage of the beam particles. The difference of curvature of the paths of the electrons entering at a greater or smaller distance from the X-axis results in that in the X-Y plane the beam is constricted strongly in a direction transverse of the main ray 15; the area of this constriction is also located in the area of the strongly increased field strength gradient. The difference in curvature of the various electron paths furthermore results in that the initially parallel beam 14 changes, after having passed by the minimum distance area to the Z-axis, into a diverging beam 18 (FIG. 3), which leaves the field space 7 in this state.

Also in the Z-direction, in FIG. 3 at right angles to the plane of the drawing, the incoming parallel beam 14 is changed into a diverging beam approximately to the same extent; however, in contrast to the X-Y plane this divergence is not preceded by a constriction of the beam in the Z-direction.

FIG. 4 illustrates the display properties of the system, the incoming beam having a defined image content by causing it to pass through a fine-mesh network or raster of substantially square mesh, arranged at right angles to the direction of the beam. FIG. 4a is a cross section of the incoming beam 14 at the area of the broken line A-A' in FIG. 3. This section contains a substantially accurate reproduction 40 of said raster. FIG. 4b is the cross section of the beam at the area of the strongest constriction parallel to the x-yplane, that is to say at the line B-B' in FIG. 3. The width of the beam measured in this direction may be reduced from the initial 0.5 to 1 mm. of the incoming beam 14 to less than 10$\mu$M. so that the beam section 41 is very narrow.

Figure 4A:
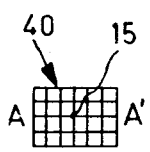
Figure 4B:
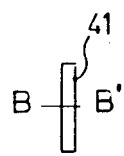
Figure 4C:
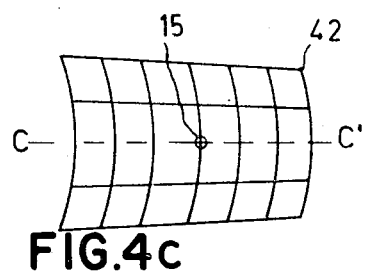
Figure 4D:
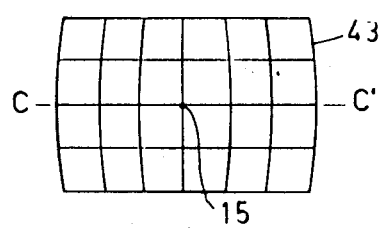

FIG. 4c and 4d illustrates the image contents of the diverging beam 18 at the area of the line C-C' in FIG. 3. FIG. 4c shows the reproduction 42 of the said raster for the case in which, in contrast to the deflection system described above, the locally increased field strength gradient due to the additional construction of the field space is not available or is not capable of exerting an influence. This would be the case when the pole faces are constructed so that the intersection with the X-Z plane does not form the curved boundary line of FIG. 2, but forms the straight line 8 or in the deflection system of FIG. 1 by a mismatch of the velocity of the electrons and the energization the beam reverts already before reaching the additional constriction of the field space. Then the reproduction of the raster at the line C-C' (see FIG. 4c) exhibits various defects, the most important of which may be that the lines of the raster transverse of the X-Y plane exhibit a distinct curvature. A further potential defect is a variable magnification in the direction C-C', which may give rise to convergence in the direction of the raster lines initially extending parallel to the X-Y plane. The influence of the latter defect on an image formed by the beam on a target plate can in most cases be sufficiently reduced by arranging the target plate transversely of the X-Y plane but not transversely of the main ray of the beam so that the line of intersection of the target plate with the X-Y plane is at an angle differing from 90° to the main ray, i.e., the direction of the beam.

The very coincidence of a region of locally increased field strength gradient with the region where the beam enters the deflection system is reverted, i.e., meets the strongest magnetic field, in accordance with the invention, has a correcting effect or may even have an overcorrective effect on the first-mentioned defect of the curvature of the raster lines transverse of the X-Y plane.

FIG. 4d shows the reproduction 43 of the network virtually obtained at the area of the line C-C' of FIG. 3 by the deflection system described. The correction is achieved by causing the field of locally increased field strength gradient to affect the beam where it has a more or less linear section, so that the effect of this field on all particles of the beam located at a given distance from the X-Y plane is the same. An analogue is found in a correction method for the spherical aberration of electron beams described by Scherzer, where the correcting steps are also applied to a beam initially deformed astigmaticlay to a more or less linear section.

It has been found that with the deflection system of FIG. 1 not only the curvature of the image lines transverse of the X-Y plane shown in FIG. 4c can be reduced or even inverted, but also said variation of the magnification in the direction C-C' can be reduced or even changed to the contrary. Adaptation to the requirements, which may be different for different parts of the image field, is possible by varying the velocity of the particles, by varying the energization of the deflection system and by varying the place and the direction of the incident beam.

Figure 5:
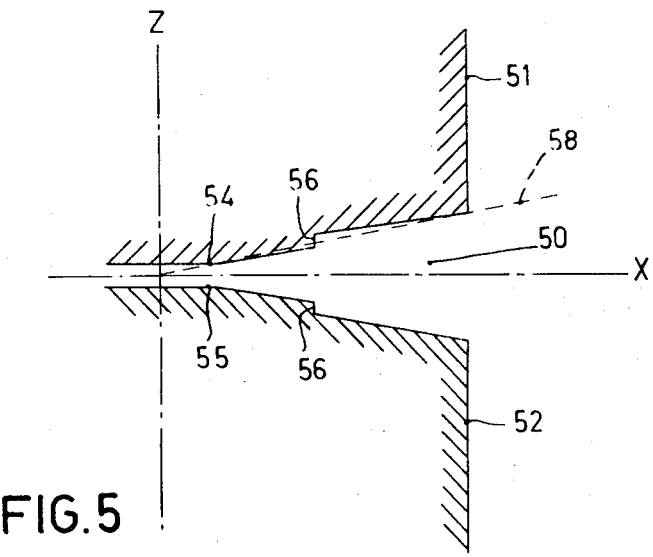
FIG. 5 is a sectional view of a pole face having a shape differing from that of the pole face of FIG. 3 taken in an axial plane.

FIG. 5 shows the intersection of the pole faces with the X-Z plane of a deflection system for use in a device according to the invention, which system differs only in this respect from the deflection system of FIG. 1. The additional constriction of the field space 50 (FIG. 5) is not formed by a portion of the pole face—portion 10 in FIG. 1—, which extends more or less gradually in a radial direction, but is formed here by a rim 56 of the pole faces 54 and 55 of the poles 51 and 52, which rim extends in the Z-direction. The radius of this rim is located between 0.4 and 0.6—times the radius of the circumference of the poles 51 and 52. The pole faces 54 and 55 are mainly conical planes having a half vertex of about 84°; the section of this conical plane for the pole face 54 is indicated by the broken line 58. With the dimensions of the deflection system given by way of example with reference to the system of FIG. 1 the height of the rims 56 may be about 0.3 mm.

Figure 6:
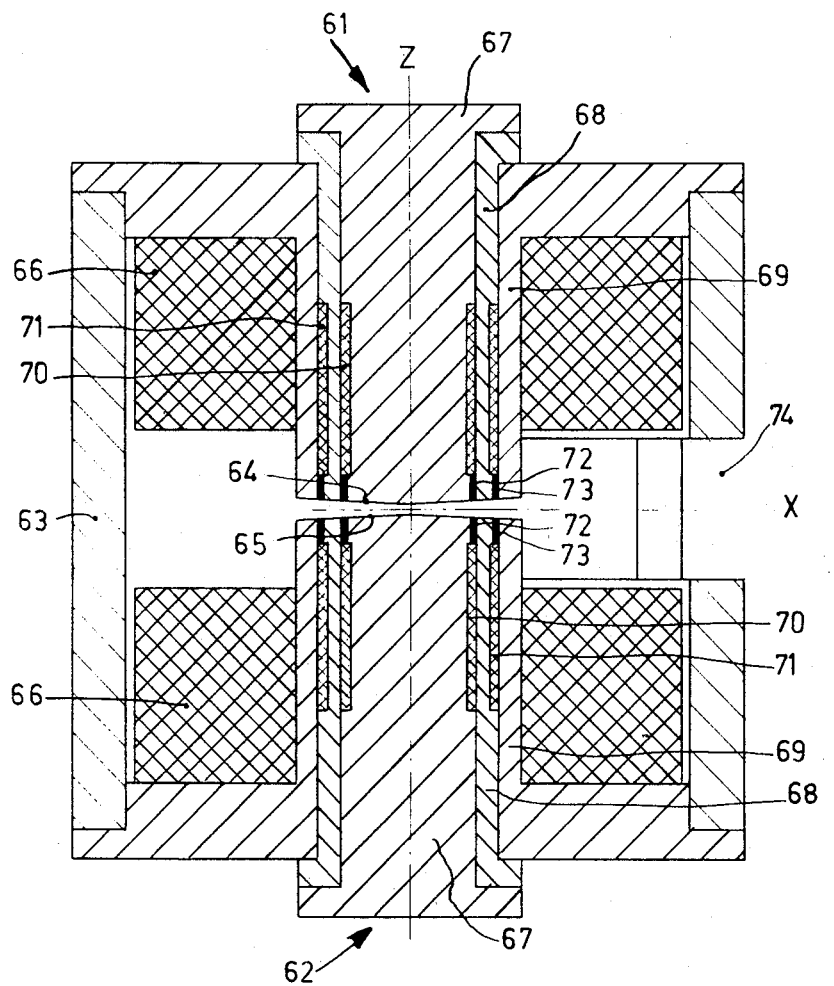
FIG. 6 is a vertical sectional view of a different embodiment of a deflection system for use in a device according to the invention.

FIG. 6 shows the intersection of a different deflection system for use in a device according to the invention with a plane going through the Z-axis, which system is substantially rotation-symmetrical to said axis. The magnet poles 61 and 62 interconnected at their extremities by a tubular magnetic yoke 63 have opposite pole faces 64 and 65, which are conical with the exception of a small central portion and which have their vertices located midway between the pole faces on the Z-axis. Each magnet pole has three concentrical portions 67, 68 and 69. The central portions 67 and 68 are provided with depressions at the circumference for receiving a separate energizing coil 70 and 71 respectively. Said depressions extend, though with smaller depth, up to the faces of the magnet poles, so that a circular gap 72 and 73 respectively is formed at the area of the pole faces 64 and 65 between the portions 67 and 68 and also between the portions 68 and 69. The width of these gaps is small and may be 0.1 mm. These ferromagnetism-free gaps may, but need not be filled out with insulating material, for example a synthetic resin; in connection with heat transfer a nonmagnetic metal, for example, copper is preferred. The outermost portions 69 of the magnet poles are each surrounded by an energizing coil 66.

The tube 63 of ferromagnetic material has a lateral opening 74 extending, for example, over a quarter to half of the circumference, through which a beam of electrons or other charge carriers extending parallel to the plane of symmetry x transverse of the z-axis can pass for being injected between the pole faces 64 and 65, while it can emerge through said opening subsequent to deflection to a given extent.

The outer diameter of the concentrical portions 67, 68 and 69 of the magnet poles may be 12, 16 and 20 mms. respectively.

When the coils 70 are energized in the same sense as the coils 66, an additional amplification of the field already increasing in a radial direction produced by the energization of the coil 66 alone is obtained in the field space between the pole portions 67, which amplification results at the area of the circumference of the portions 67 in a locally highly increased field strength gradient.

When the coils 71 are energized in a sense opposite that of the coils 66 and 70, a field distribution may be obtained between the pole faces, which is analogous to that of the deflection system shown in FIG. 1.

The energization below is appropriate when the incident beam contains electrons accelerated to about 10 kv.:coils 66:85 ampere turns, coils 71:−10 ampere turns (that is to say opposite the coils 66 and 70), coils 70:65 ampere turns.

Figure 7:
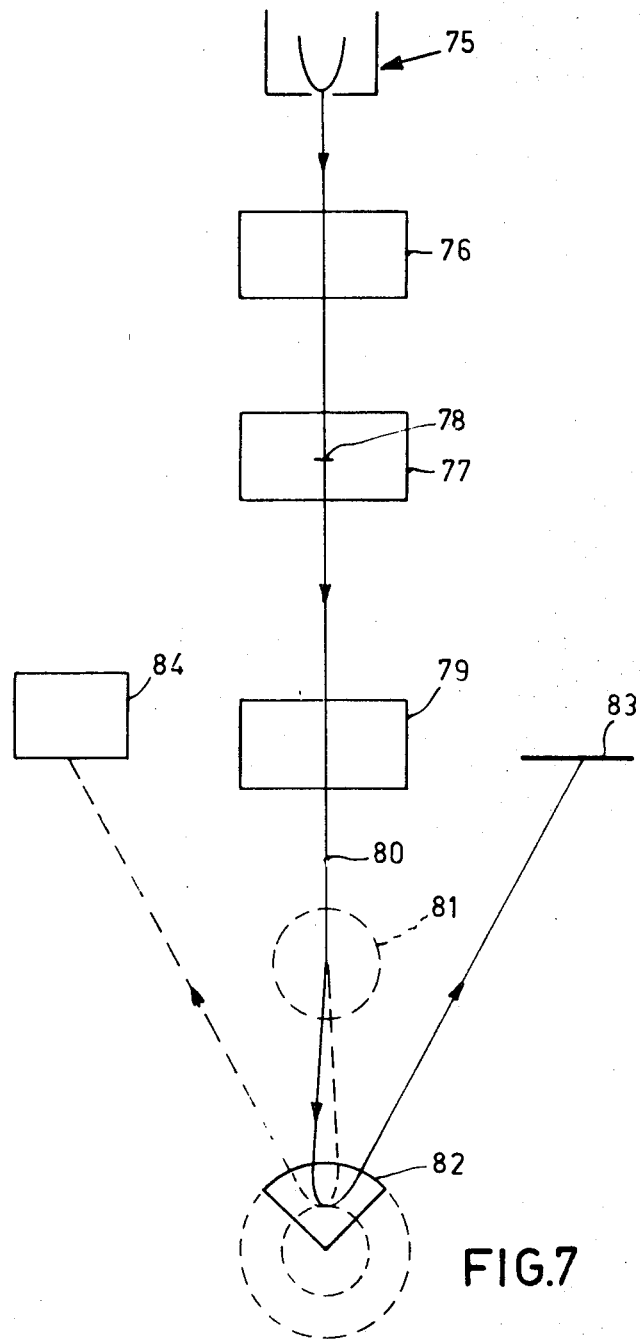
FIG. 7 illustrates schematically a device according to the invention formed by an electron microscope.

FIG. 7 shows quite schematically a device according to the invention formed by an electron microscope. The microscope comprises, as usual, an electron gun 75, a condenser lens 76, an object lens 77, in which the object 78 can be arranged, and a projector lens 79, all which parts are arranged on one line which forms in addition the path of the electron beam 80. After the object lens 77 is arranged a deflection system 82 of the kind set forth. The electron beam is deflected therein through approximately 180° and in dependence upon the direction of the magnetic field in the deflection system 82 it is directed to a luminescent screen 83 or a plate or film camera 84 for photographic recording of the image located approximately at the level of the projector lens 79 or of the object lens. In order to ensure the correct direction of incidence of the beam in the deflection system 82 at the transition of the luminescent screen to the camera or conversely, deflection means 81 are arranged between the projector lens 79 and the deflection system for deflecting the electron beam 80 slightly in one direction or the other in the plane of symmetry of the deflection system. The deflection means 81 may be capable of producing a reversible magnetic field transverse of the plane of the drawing, the direction of which is inverted simultaneously with the reversal of the energization of the deflection system.

The planes of the target member 83 and 84 need not invariably be at right angles to the direction of the incident electron beam. It is stated above that any variable magnification of the image introduced by the deflection system 82 can be obviated or at least reduced by disposing the target plane obliquely to the direction of the incident beam.

Since, as is shown clearly in FIG. 7, mainly that part of the deflection system 82 which is located inside the angle between the beams deflected to the screen 83 and to the camera 84 is effectively employed, the magnet poles with their pole faces need not form complete bodies of revolution; it is sufficient for them to cover the required sector and, in order to suppress undesirable peripheral effects, slightly more and the region where the beam 80 is deflected. For this reason FIG. 7 shows the poles by a solid line only for such a sector.

Figure 8:
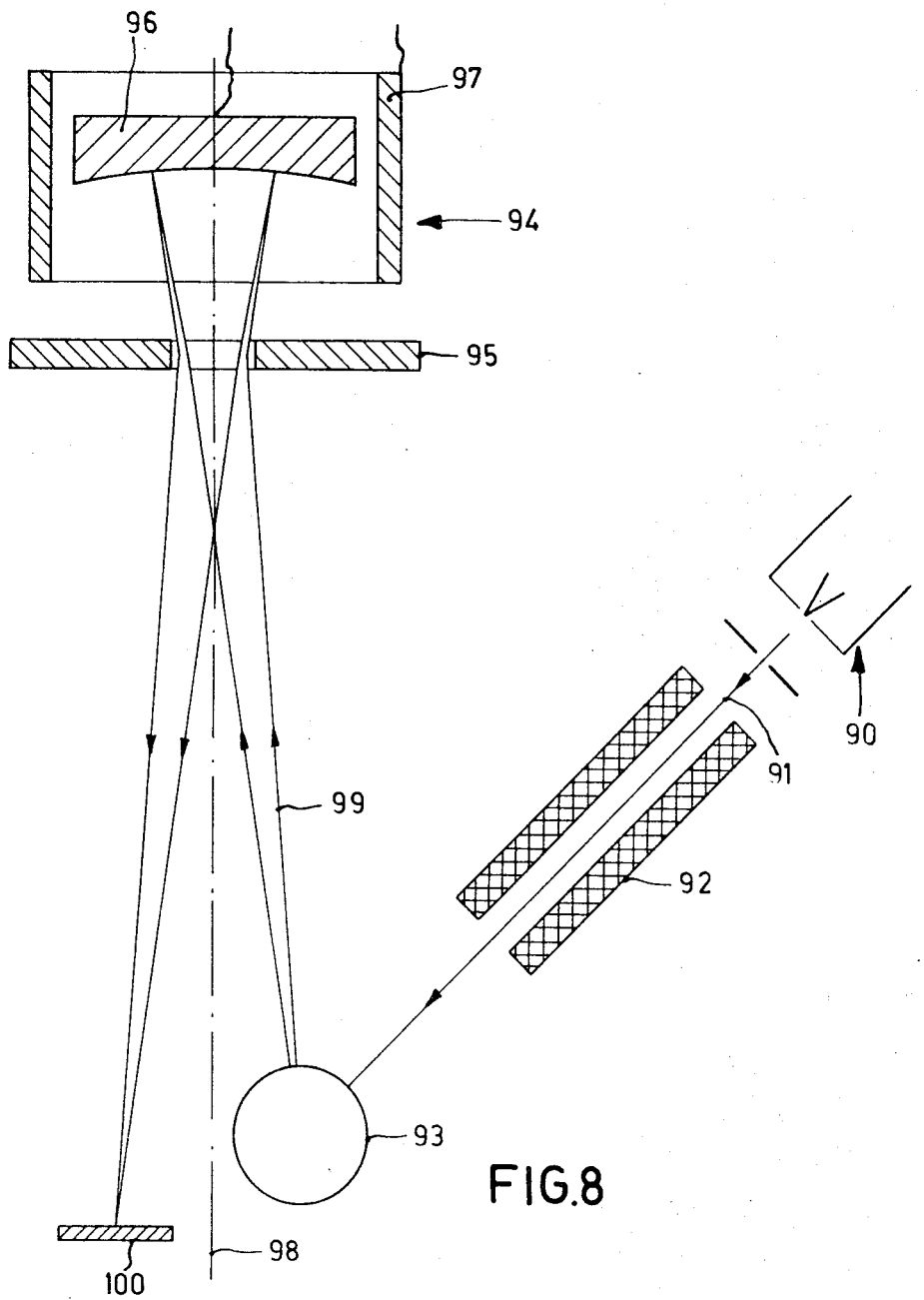
FIG. 8 shows schematically a device according to the invention formed by an X-ray analyzer having a microelectron beam probe.

FIG. 8 shows schematically a device according to the invention formed by an X-ray analyzer having a microelectron beam probe. An electron beam 91 emanating from an electron gun 90 is collimated by a comparatively long energizing coil 92 of small inner diameter and then enters a magnetic deflection system 93 of the kind described above. In this deflection system 93 the initially parallel beam is deflected and converted into a diverging beam 99, which emanates so to say from a dot-shaped source located inside the deflection system. The device comprises furthermore a hollow electron mirror 94 having a diaphragm 95 at cathode potential, after which a mirror element 96 is arranged, which forms a convex surface and is highly conductive. The mirror element 96, which is at a comparatively low negative potential to the cathode of the gun 90, is surrounded by a correction element 97, formed by a conductive hollow cylinder and being at an adjustable negative potential. The axis 98 of the electron mirror is located in the plane of symmetry of the deflection system and passes closely by the deflection system 93, the distance between this system and the electron mirror 94 being chosen so that the mirror focuses the diverging beam emanating from the deflection system substantially to a point on the object 100, arranged on the other side of the axis 98 approximately at the same height. Owing to the electron impact X-rays of one or more wavelengths characteristic of the material of the place of impact are produced at the surface of the object. The X-rays are examined by means of an X-ray spectograph (not shown). The advantage of the device described is that by the said method of forming the electron beam focused to the object 100 the space around the object is satisfactorily accessible.

In the embodiments described above for deflection systems for use in a device according to the invention the magnetic field is produced by energizing coils. It will be obvious that permanent magnets may be employed instead.

It is not necessary for the pole faces to form planes of revolution, that is to say for the magnetic field to be symmetrical upon rotation. The intersection of the planes of constant magnetic field strength with the plane of symmetry ($X$-$y$ plane) may differ from the circular form, for example they may form an ellipse. In the case of a wedge-shaped field space, wherein the pole faces form flat planes at an angle to each other, said intersections are straight lines. In a deflection system having such a wedge-shaped space an incident parallel beam is, subsequent to deflection, substantially not diverged in the plane of symmetry.

The portion of the magnetic field located beyond the place of reversal of the incoming beam, viewed in the direction of said beam—in the embodiments shown the field in the vicinity of the Z-axis—does not play an essential part. With rotation-symmetrical poles therefore a central portion thereof may be omitted, for example, by providing hollow poles or by providing depressions of the pole faces around the axis of revolution, which permits reducing the required number of ampere turns.

What is claimed is:

1. A device for deflecting a beam of charged particles including a magnetic deflection system having a plane of symmetry passing through a main ray of said beam comprising two mirror symmetrical magnet poles disposed on opposite sides of said plane of symmetry, the opposing surfaces of the poles having contours which define a space therebetween which varies stepwise in the direction of said main ray with a central portion having a constricted cross section defining a region of highest magnetic field strength, said deflection system having a strength at which the main ray of the beam entering the deflection system, which ray extends at least partly in the direction of constriction of the space between the pole faces, follows a curve therebetween, which curve passes between the pole-faces in the region of the highest magnetic field strength, and at the area at which the distance of said curve from the region of the highest magnetic field strength is shortest a field strength distribution which, measured in the direction towards the region of the highest magnetic field strength, exhibits at said area a locally stronger field strength gradient, which field strength distribution affects the beam so that a curvature of image lines transverse to the plane of symmetry in a plane transverse to the main ray is counteracted.

2. A device as claimed in claim 1 wherein at a distance from the region of the highest field strength corresponding with the shortest distance between this region and the main ray of the beam the pole faces have a steplike profile so that the space between the two pole faces, viewed in the direction towards the region of the highest field strength, exhibits a substantially abrupt constriction.

3. A device as claimed in claim 1 wherein the magnet poles are electromagnetically energized and are formed by spaced concentric sections, which are energized differently and are located one after the other in the direction towards the region of the highest magnetic field strength in the field space and separated from each other by a narrow ferromagnetism-free gap at the area of the pole face formed by the common ends of said sections, one of said gaps being located at a distance from the region of the highest field strength corresponding to the shortest distance between said region and said main ray.

4. A device as claimed in claim 1 wherein the portion of the plane of symmetry lying between the pole faces the magnetic field strength is mainly inversely proportional to the distaNce from the region where the planes mainly defining the pole faces intersect each other.

5. A device as claimed in claim 1 wherein the opposite faces of the poles are located in planes of revolution having an axis of revolution transverse to the plane of symmetry.

6. A device as claimed in claim 5 wherein the pole faces are mainly located in conical planes of revolution having their vertices at the point of intersection of the axis of revolution with said plane of symmetry.

7. A device as claimed in claim 6, wherein the region of locally stronger field strength gradient is located approximately midway between the outer peripheries of the pole faces and the axis of revolution.

8. In an electron microscope including an electron beam source, an objective lens, a projection lens, and a target member positioned to intercept the electron beam, the improvement comprising a deflection system as claimed in claim 1 is arranged after the objective and which deflects the electron beam through an angle of more than 90°, the electron beam emanating from the deflection system being directed to a target member for reproducing or recording the image.

9. A device as claimed in claim 8 comprising two target members, at least one of which is equipped with a luminescent screen for displaying the image, said target members being arranged in the plane of symmetry of the deflection system on either side of the beam directed to the deflection system, and means for changing over the beam from one target member to the other by reversing the magnetic field in the field space of the deflection system and by shifting the plane of the beam directed to the deflection system.

10. In an X-ray analyzer comprising an electron beam source and means to focus the electron beam onto an object to be examined, the improvement comprising a deflection system as claimed in claim 5 arranged near the focus of a hollow electron mirror, a collimated electron beam being deflected and directed to the electron mirror, which focuses the beam onto the object disposed in the vicinity of the deflection system.

* * * * *